Figure 3:
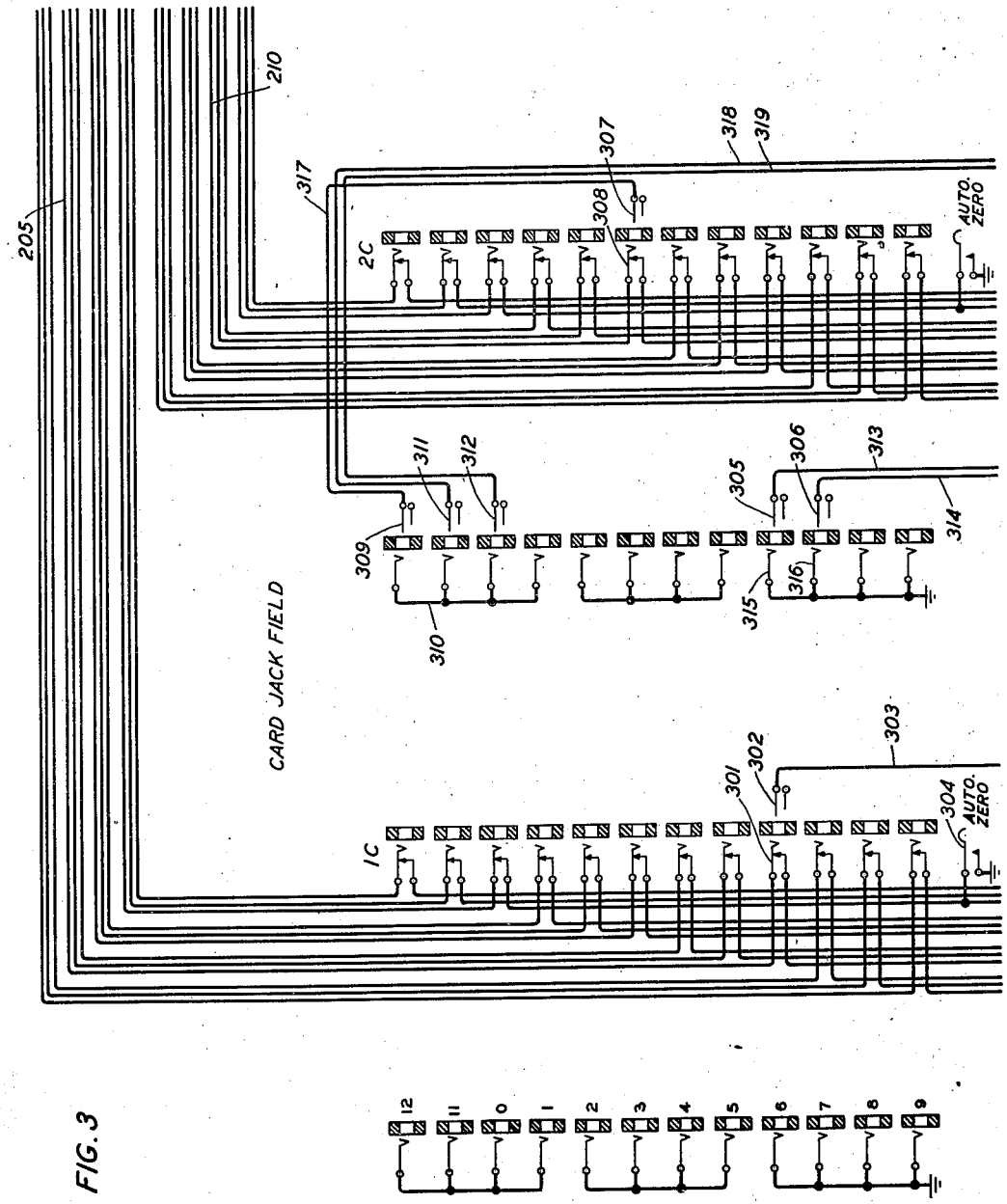

March 24, 1936.  A. BAILEY ET AL  2,034,791
STATISTICAL TABULATING AND PRINTING TELEGRAPH SYSTEM
Filed Jan. 25, 1934   12 Sheets-Sheet 1
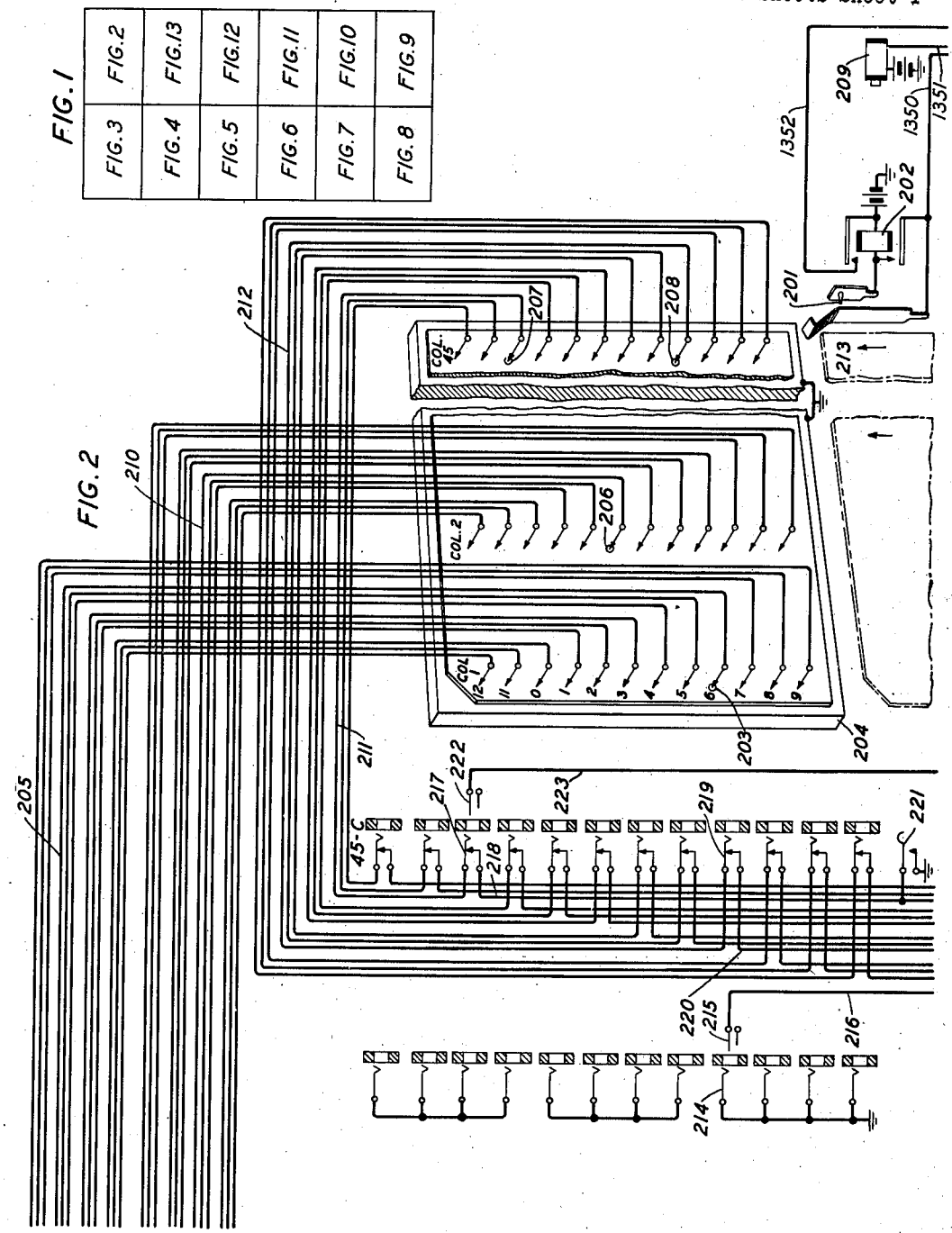
INVENTORS: A. BAILEY
H. M. THOMSON
BY
ATTORNEY March 24, 1936.  A. BAILEY ET AL  2,034,791
STATISTICAL TABULATING AND PRINTING TELEGRAPH SYSTEM
Filed Jan. 25, 1934   12 Sheets-Sheet 2

INVENTORS: A. BAILEY
H. M. THOMSON
BY
ATTORNEY

March 24, 1936.  A. BAILEY ET AL  2,034,791
STATISTICAL TABULATING AND PRINTING TELEGRAPH SYSTEM
Filed Jan. 25, 1934  12 Sheets-Sheet 3

INVENTORS: A. BAILEY
H. M. THOMSON
BY
ATTORNEY

INVENTORS: A. BAILEY
H. M. THOMSON
BY
ATTORNEY

March 24, 1936.  A. BAILEY ET AL  2,034,791
STATISTICAL TABULATING AND PRINTING TELEGRAPH SYSTEM
Filed Jan. 25, 1934   12 Sheets-Sheet 7
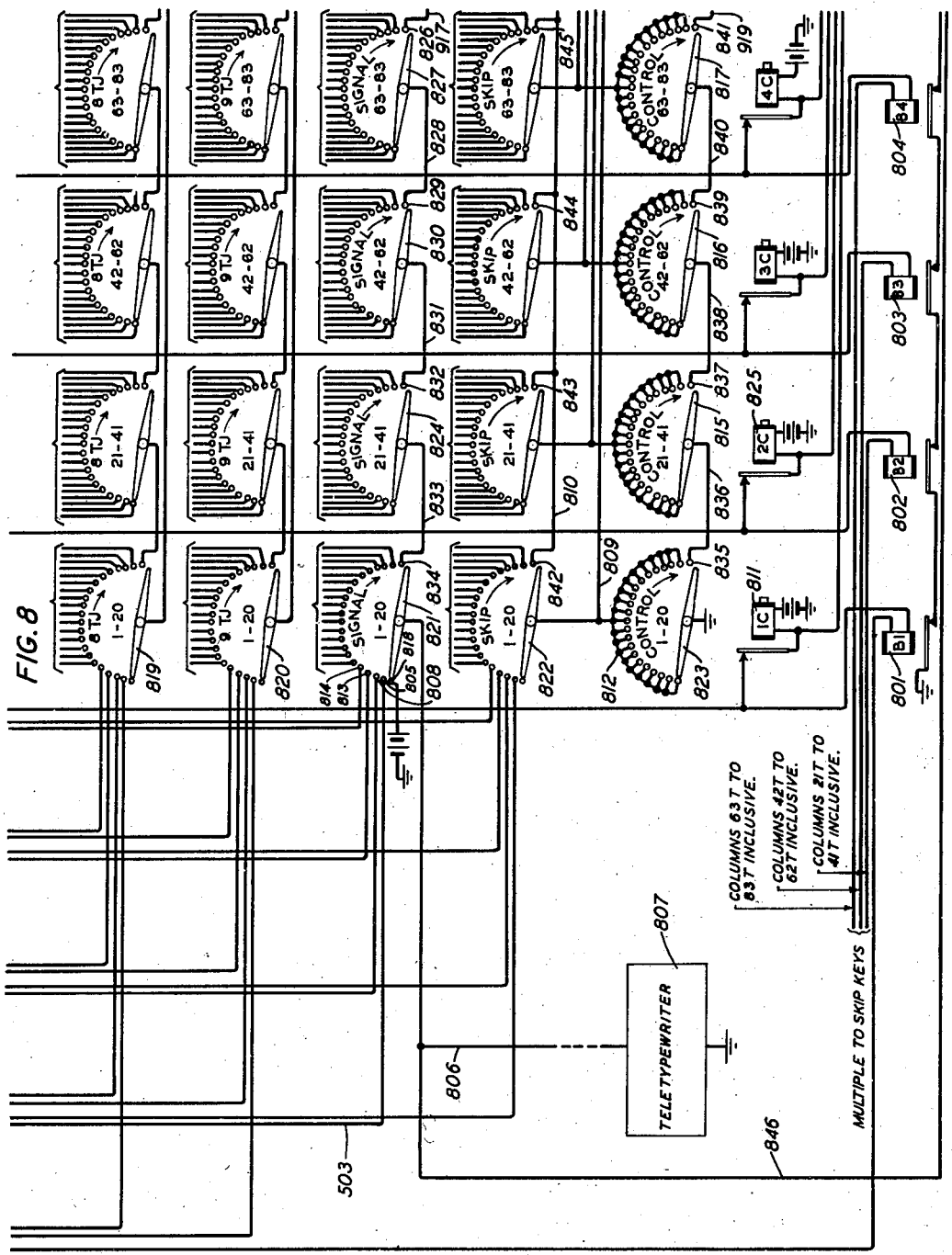
INVENTORS: A. BAILEY
H.M. THOMSON
BY
ATTORNEY

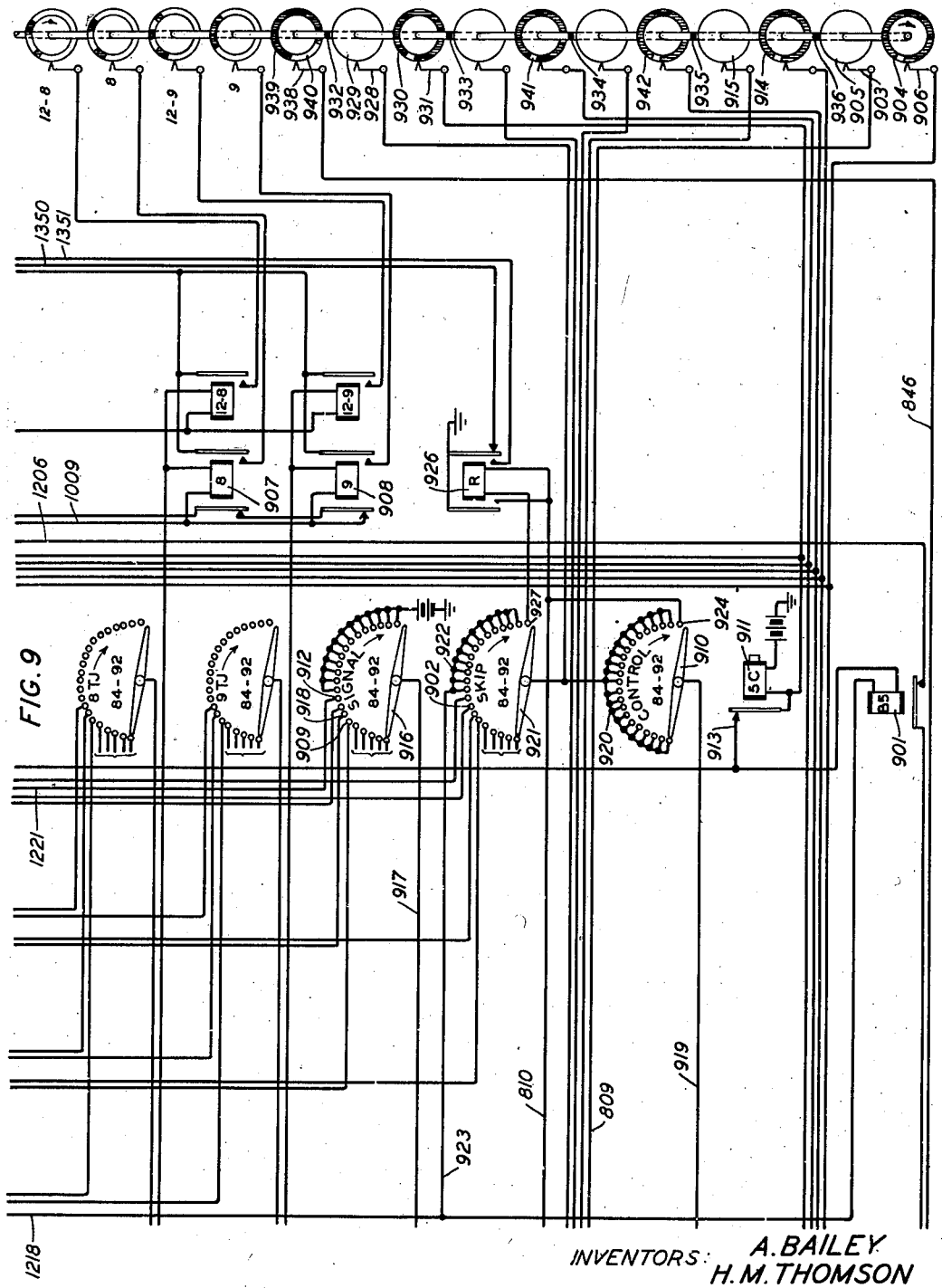

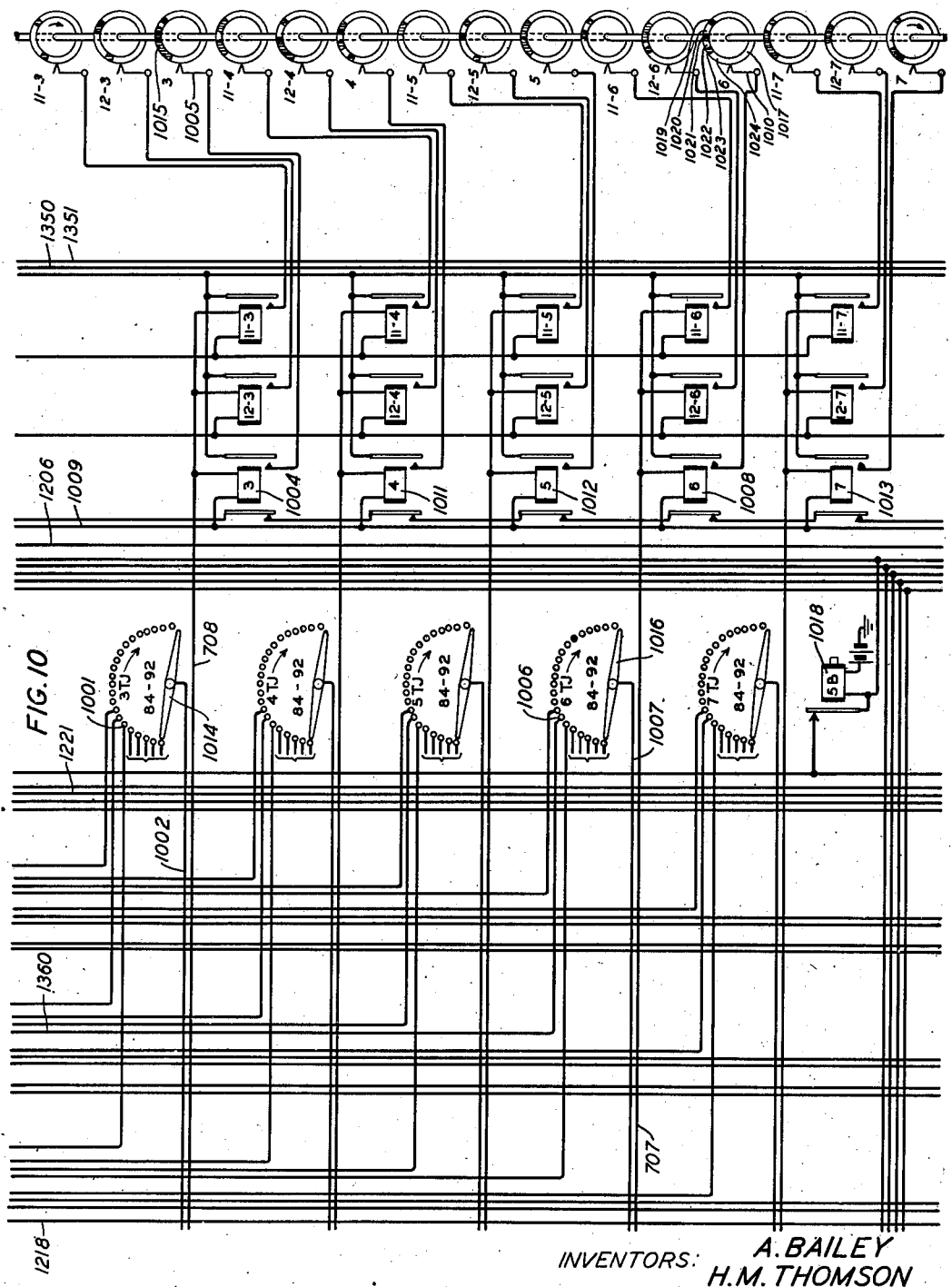

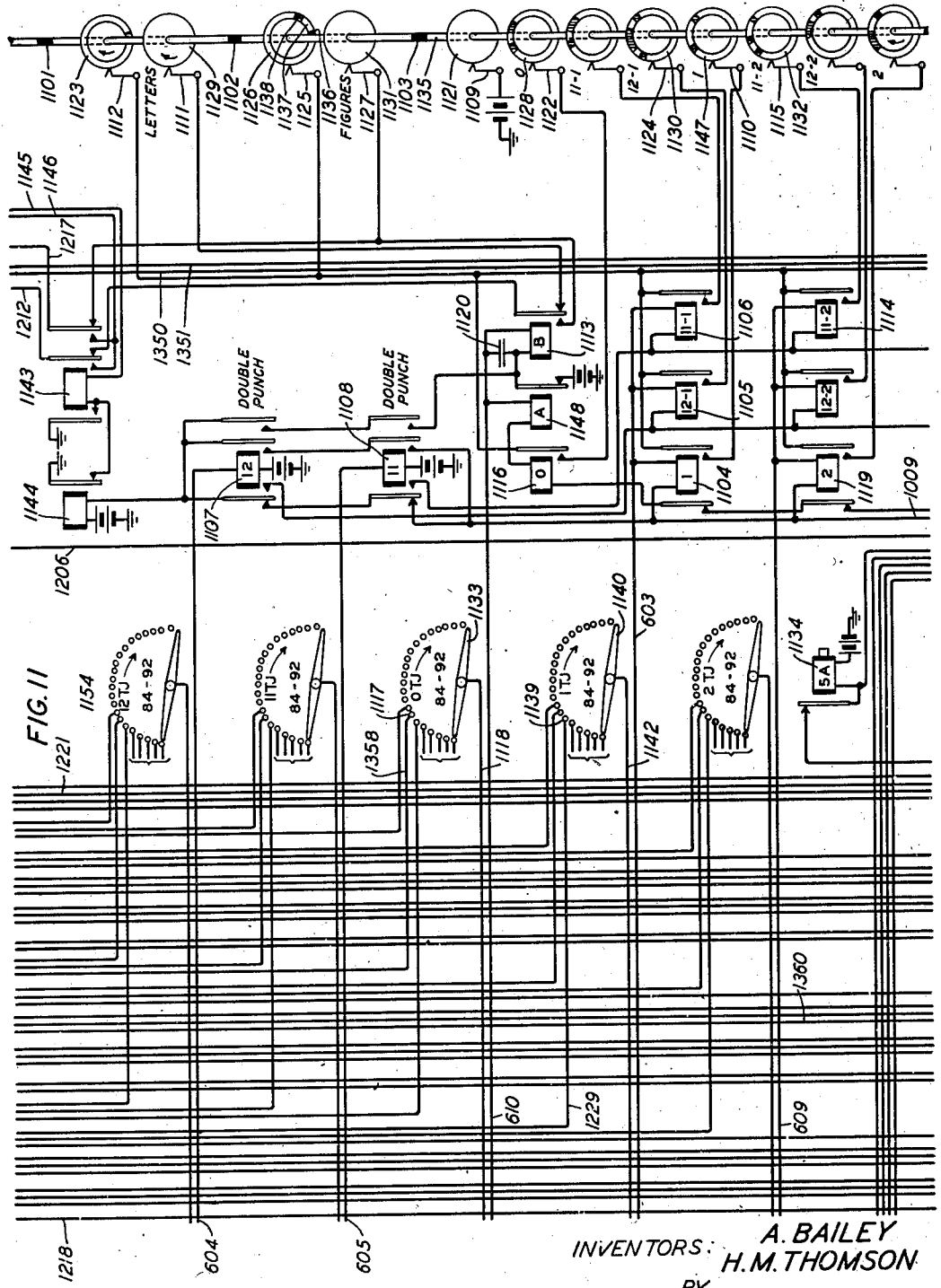

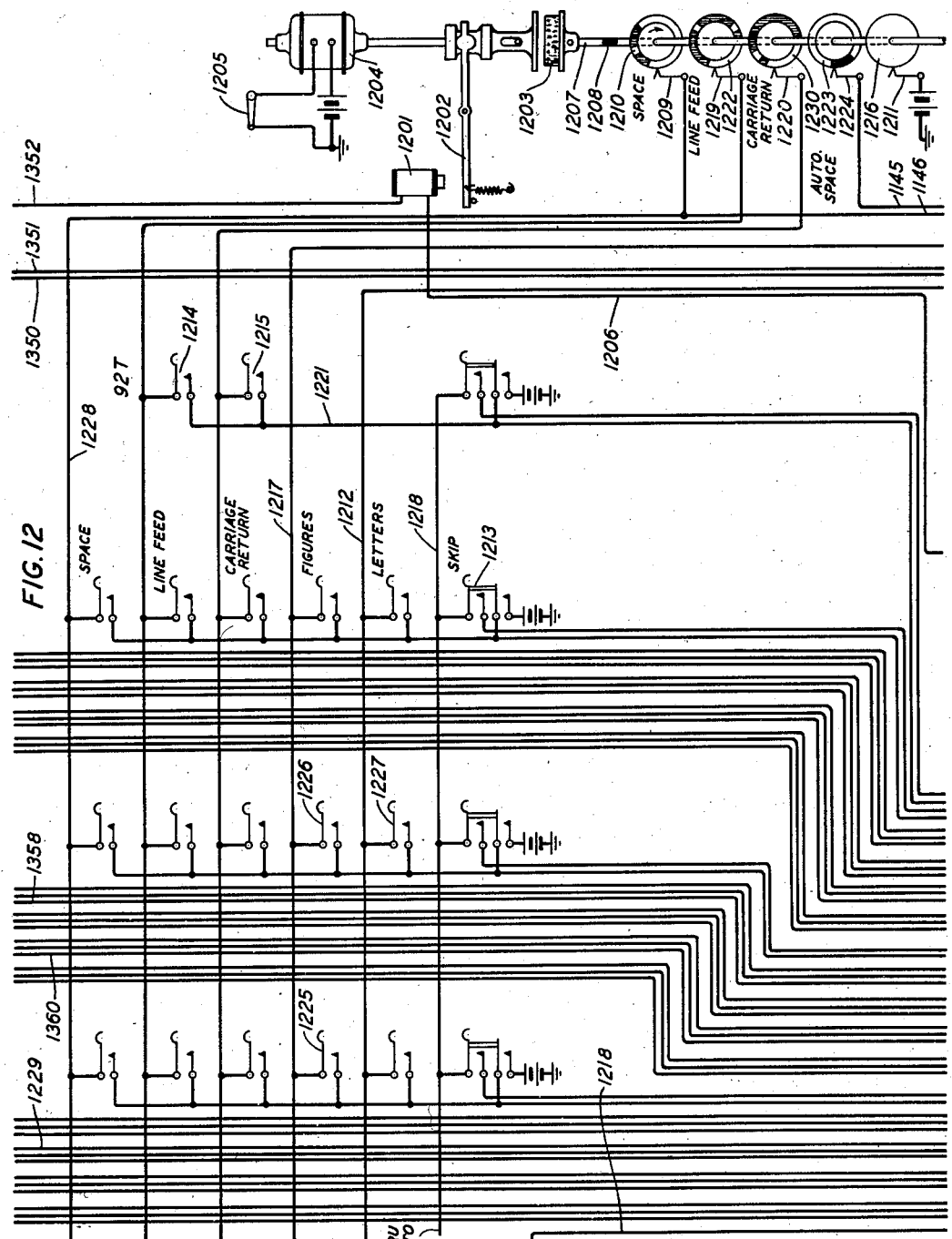

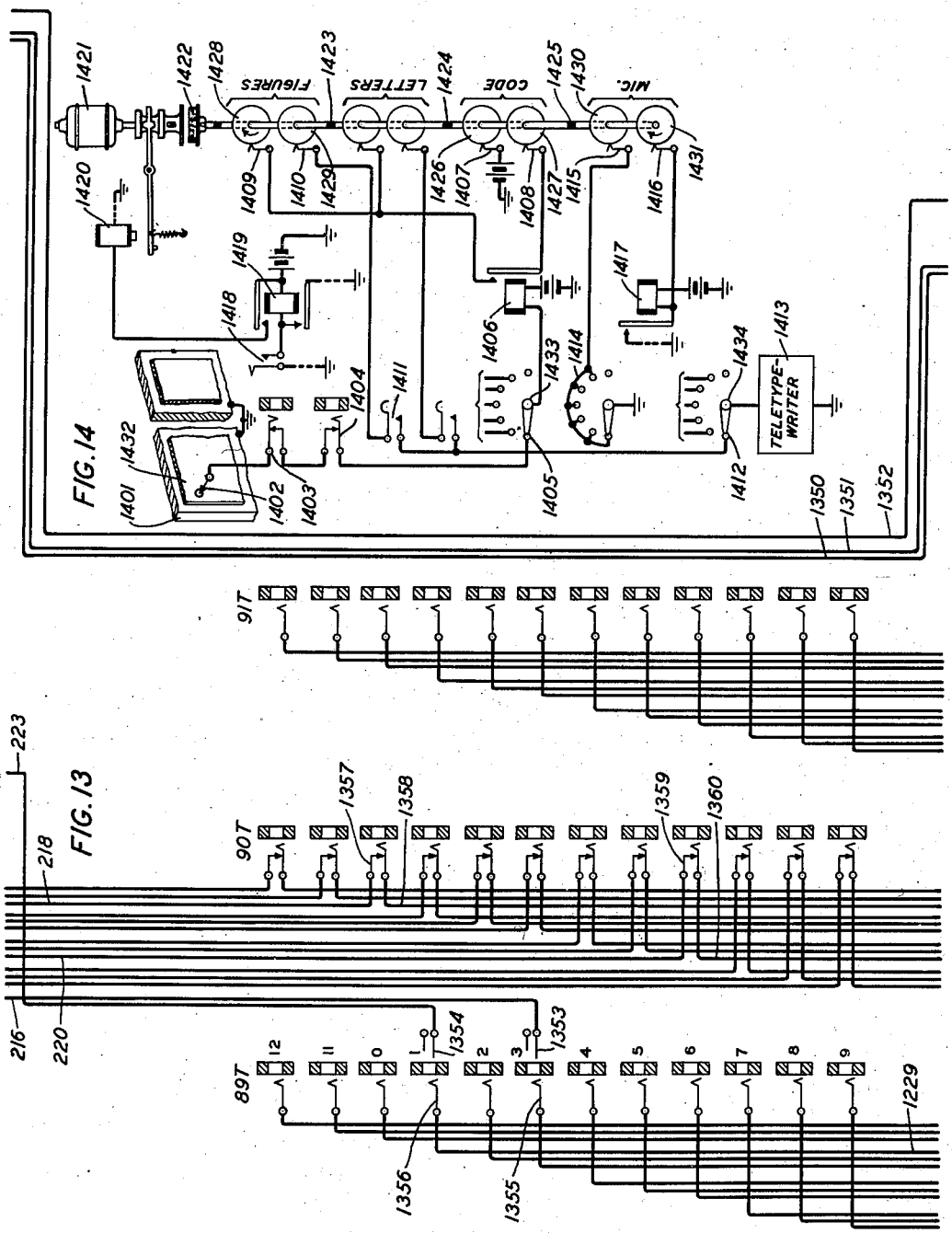

Patented Mar. 24, 1936

2,034,791

UNITED STATES PATENT OFFICE 2,034,791

STATISTICAL TABULATING AND PRINTING TELEGRAPH SYSTEM

Austin Bailey, Maplewood, N. J., and Howard Mearns Thomson, New York, N. Y., assignors to American Telephone and Telegraph Company, a corporation of New York Application January 25, 1934, Serial No. 708,294

18 Claims. (Cl. 178—4)

This invention relates to the combination of statistical and printing telegraph systems for tabulating or translating of information recorded on perforated cards.

The object of the invention is to provide a reliable and flexible arrangement whereby the information recorded on perforated cards may be tabulated on a telegraph page or tape printer through the medium of printing telegraph transmitting and receiving apparatus.

The statistical machines in use either do not provide for translating, listing and printing both letters and figures or they do not provide for printing all the letters of the alphabet. For example, in some machines o and q, u and v, and x and z are each expressed by a combination symbol. In addition, these machines will print only letters in certain columns and only figures in certain other columns depending upon the construction of the machine.

The object of this invention is to provide a translator which will list and print all the characters of the alphabet and the numbers as well as other characters and symbols in any column without any ambiguity and in any desired order so that information for telephone directories, radio signals, invoices, sales and other statistical information may be recorded on perforated cards and listed on a teletypewriter or transmitted over a telegraph circuit to a distant teletypewriter to be listed at the distant point. Complete flexibility is provided so that a character punched on the card may be caused to be printed as another character on the printer, to be printed in a different column from that in which the punch appears, to be duplicated in more than one column, or to be ignored altogether. Arrangements are also made whereby any predetermined character may be printed in any column, regardless of whether or not any character is punched in the corresponding column on the perforated card.

Another object of the invention is to combine a telegraph printing mechanism with a statistical translator so that the telegraph printer will print or list the information recorded on punched census cards.

A feature of the invention is a system in which the code of the punches on the perforated card may be translated into the standard five unit printing telegraph code or into any other code desired which may be transmitted over a telegraph system to one or more telegraph receiving and printing devices.

Another feature is a device which is provided so that a specified perforation of one column may be used to control a character in another column without the loss of the function of the perforation in the column in which it is actually punched.

One specific embodiment of the invention comprises a group of card controlled contacts arranged in columns connected through a plurality of cross-connecting jacks also arranged in columns to a group of selectors for selecting these contacts or jacks column by column. A group of keys associated with each column of jacks is also connected to the selectors. A translator and a telegraph signal transmitter are connected to the selectors. A telegraph printing mechanism sometimes called a teletypewriter is connected to the transmitter so that the telegraph printer will list information recorded on the statistical cards. A control circuit is provided for the selectors which causes one group of selectors to simultaneously advance over all their contacts and then the next group of selectors to simultaneously advance over all their contacts and then all the selectors to be restored to normal when all of them have advanced over all of their contacts. This control circuit is arranged so that the selectors may skip any desired set of contacts connected to any column of contacts or jacks.

These and other objects and features of the invention may be more readily understood from the following description of one specific embodiment of the invention when read with reference to the accompanying drawings in which Figure 1 shows the order in which Figs. 2 to 13, inclusive, should be arranged to form a complete operative system and Fig. 14 shows, in an abbreviated form, a schematic arrangement of the invention.

In the system shown on the drawings a 45 column card has been selected by way of illustration and provision has been made for expanding the information contained on the card into 91 columns on a page printer. The springs which make contact through holes in the card are arranged in 45 columns and each spring is connected to a corresponding jack in the 45 column "Card jack field". The jacks in the "Card jack field" are arranged to be cross-connected to similar jacks in the 91 column "Tabulator jack field", the additional columns being used to expand the information on the card as desired. The columns of jacks in the "Tabulator jack field" are connected through a progressively operated switch or selector to a multiplicity of relays which in turn control the connection of a set of cams to a single telegraph channel of a communication circuit which in turn is connected to a teletypewriter in such a manner that the individual cams send pulses over the communication circuit to the teletypewriter in accordance with the punches on the card. Each jack in the card field is normally connected to the corresponding jack in the tabulator field but this connection is opened whenever a patching cord is used to obtain a duplicate entry or a translation of the information contained on the card. Keys are provided in each column so that the usual figures or letters code combination will be transmitted to the teletypewriter in addition to the code combination representing the character to be recorded. Although the operation of the letters key or figures key in a column ordinarily associates that column with either letters or figures, provision has been made to print figures or other non-letter characters in a column in which letters are normally expected, by adding a punch in the zero position to the punch combination on the card, which represents the desired character, except for P when punches in both the 11 and 12 positions are added to the zero punch. Provision is also made to send all the other characters usually used in connection with the teletypewriter page printer, such as line feed, carriage return and space. Skip keys have been provided which when operated cause the corresponding column to be skipped. A special key labeled "Auto Zero" is included in each column of keys in the card jack field which when operated causes a 0 to be printed for that column.

For purposes of illustration a two digit code has been selected for the punched cards, the different characters being arranged as a single punch in any of ten different positions or as a double punch consisting of a punch in positions 0 to 9 and an additional punch in positions 11 or 12. The code which has been selected for purposes of illustration is as follows:

*Code for punched cards*

| Position punched | Zero | First | Second | Third | Fourth | Fifth | Sixth | Seventh | Eighth | Ninth |
|---|---|---|---|---|---|---|---|---|---|---|
| Single punch Figures | 0 | 1 | 2 | 3 | 4 | 5 | 6 | 7 | 8 | 9 |
| Single punch Letters | P | Q | W | E | R | T | Y | U | I | O |
| Double punch with 12 Figures | | $ | ? | : | - | ! | £ | . | , | Bell |
| Double punch with 12 Letters | | D | B | C | A | F | H | M | N | S |
| Double punch with 11 Figures | | & | ' | ( | ) | ; | / | " | | |
| Double punch with 11 Letters | | G | J | K | L | V | X | Z | | |

Referring to Fig. 14 which shows in an abbreviated form a schematic arrangement of the invention, a card 1432 containing punched information is introduced against the metallic plate 1401 and under the "feeler" or contact springs, one of which is shown as spring 1402. The introduction of the card momentarily closes contacts 1418, causing the operation of relay 1419 which locks up to ground through contacts in the card control circuit and in turn causes clutch magnet 1420 to energize and engage clutch member 1422 with the rotating motor 1421. If a hole is punched in the card under spring 1402, ground from the metallic plate 1401 is connected to spring 1402 and is transmitted through springs 1403 of the card jack field and 1404 of the tabulator jack field through contact 1405 of switch 1433 which is standing on a set of contacts which are connected to the column of springs which include spring 1402, and through the winding of relay 1406 to battery, operating relay 1406. As the shaft containing cams 1428, 1429, 1426, 1427, 1430, and 1431 revolves, a circuit is closed from battery through brush 1407, cam 1426, cam 1427, brush 1408, contacts of relay 1406, brush 1409, cam 1428, cam 1429, brush 1410, the contacts of key 1411 which is operated to send a figures designation, contact 1412 of switch 1434 to ground through the teletypewriter 1413. Cam 1428 is cut so that as it revolves it interrupts the circuit during the first portion of the revolution to send a set of pulses which are interpreted by the teletypewriter as the figures designation, and cam 1427 is cut to send during the second portion of the revolution a set of pulses which correspond to the character represented by the hole punched in card 1432. Just before the cams complete the revolution cam 1431 makes contact with brush 1416 so that the stepping magnet 1417 is energized to step the brushes of the switch to the next set of contacts which correspond to the next column of punches on the card. In order to keep the different electrical currents from traversing the shaft, insulating couplings 1423, 1424 and 1425 are used between each set of cams.

The operation of the system will now be described in detail, insofar as such a description tends to explain the features of the invention.

The switching means provided comprise 15 rotary switches similar to the type described in the patent to A. H. Adams 1,399,728, December 13, 1921. Each of these switches are provided with five rows of contacts and a wiper arm for each row of contacts. The switches are divided into five groups of three switches each, the three switches in each group being associated together on a common shaft and operated simultaneously by operating their magnets in parallel. Thus switch magnets 811, 709 and 615 are operated and released as a unit and wiper arms 616, 617, 618, 619, 620, 722, 711, 712, 713, 714, 819, 820, 821, 822, and 823 advance together over their respective banks. For the sake of brevity the switch group associated with the magnets and wiper arms just enumerated will be referred to as switch 650 and the other similar switch groups as switches 651, 652, 653 and 1154. Thus each of the switches 650, 651, 652, 653, and 1154 have fifteen banks or rows of contacts and fifteen wiper arms so that in each position of these wiper arms they make contact with a contact in each of the fifteen banks or rows of contacts. Twelve of these contacts are connected to the jacks in one column of the tabulator field, one to the teletypewriter and two to the selector control circuit. Thus the contacts in the first bank or row of contacts of switch 650 over which wiper arm 616 moves are connected to the No. 12 tabulator jacks in columns 1 to 20 of the tabulator and are accordingly designated 12TJ 1-20 on the drawings. The contacts of the second arc or row of switch 650 over which wiper arm 617 moves are connected to the No. 11 tabulator jacks of columns 1 to 20 and are designated 11TJ 1-20. In a similar manner the contacts of each arc or row of contacts of switch 650 are connected to jacks in columns 1 to 20 of the tabulator jack field and the contacts of switch 651 are connected to jacks in columns 21 to 41 in the tabulator jack field and these contacts are so designated on the drawings. The contacts of switches 652, 653, and 1154 are likewise connected to the jacks in columns 42 to 62, 63 to 83 and 84 to 91 of the tabulator jack field.

Assume all of the switches to be in the positions shown on the drawings with their brushes standing on the first set of terminals in each case, that several cards have been inserted in the container 213 and one of them has been placed in position on plate 204 so that the springs make contact with the plate wherever holes are punched in the card, and that in placing the card in position contact 201 was momentarily closed. The closing of contact 201 causes the operation of relay 202 in a circuit traced from battery through the winding of relay 202, contact 201, conductor 1350 to ground through the right break contacts of relay 926. Relay 202 locks in a circuit from battery through its winding and lower contacts to the same ground on the right break contacts of relay 296. The operation of relay 202 causes the operation of clutch magnet 1201 in a circuit from battery on the upper contacts of relay 202 over conductor 1352, winding of clutch magnet 1201, conductor 1206 to ground through the contacts of relays 901, 804, 803, 802 and 801. It is assumed that switch 1205 has been closed causing motor 1204 to rotate, that motor 1204 rotates at a substantially constant speed, and that the operation of clutch magnet 1201 causes clutch 1203 to engage and turn shaft 1207 in the direction shown by the arrow.

In the normal position of switch 650 the teletypewriter 807 is held in its normal condition with a closed circuit from battery on contact 818 through wiper 821 and conductor 806 to ground through teletypewriter 807. As the motor rotates shaft 1207, cam 904 makes contact with brush 906 when the first revolution is nearly completed and a circuit is closed from battery through the winding of switch magnets 811, 709 and 615 in parallel, brush 906, cam 904, cam 905, brush 903, conductor 809 to ground through the strapped contacts of bank 812 and wiper 823. Switch magnets 811, 709 and 615 operate in this circuit and when shaft 1207 completes the revolution cam 904 breaks the circuit with brush 906 allowing switch magnets 811, 709 and 615 to release and step switch 650 to the second set of contacts. The cams on shaft 1207 are insulated by insulating bushings 1208, 1101, 1102, 1103, 932, 933, 934, 935, and 936 so that the electrical circuits such as between brush 906, cam 904, cam 905 and brush 903 are kept separate from the electrical circuits of the other cams on shaft 1207.

For purposes of illustration it is assumed that the first position of the teletypewriter which corresponds to position 2 of switch 650 is to be left blank and that the space key 501 is operated. A circuit is thus closed from battery through brush 1211, cams 1216 and 1210, brush 1209, conductor 1228, contacts of key 501, conductor 503, contact 805, wiper 821, conductor 806 to ground through teletypewriter 807. Conductor 896 may include a telegraph line, as shown, to some distant point. This line may also include repeaters and other telegraph apparatus. However, since this apparatus is well known and forms no part of this invention it has not been described but it is to be understood that it may be employed in this system when desirable. As cam 1210 revolves it alternately opens and closes the circuit to send signals to the teletypewriter which are interpreted by the teletypewriter as a space. Just before cam 904 completes a full revolution it makes contact with brush 906 and causes the operation of switch magnets 811, 709 and 615 in a circuit raced from battery through the windings of magnets 811, 709 and 615, brush 906, cam 904, cam 905, brush 903, conductor 809 to ground through the strapped contacts of bank 812 and wiper 823. Switch magnets 811, 709 and 615 operate under this condition and when cam 904 breaks contact with brush 906 they release, advancing switch 650 to the next or third set of contacts.

Figure 4:
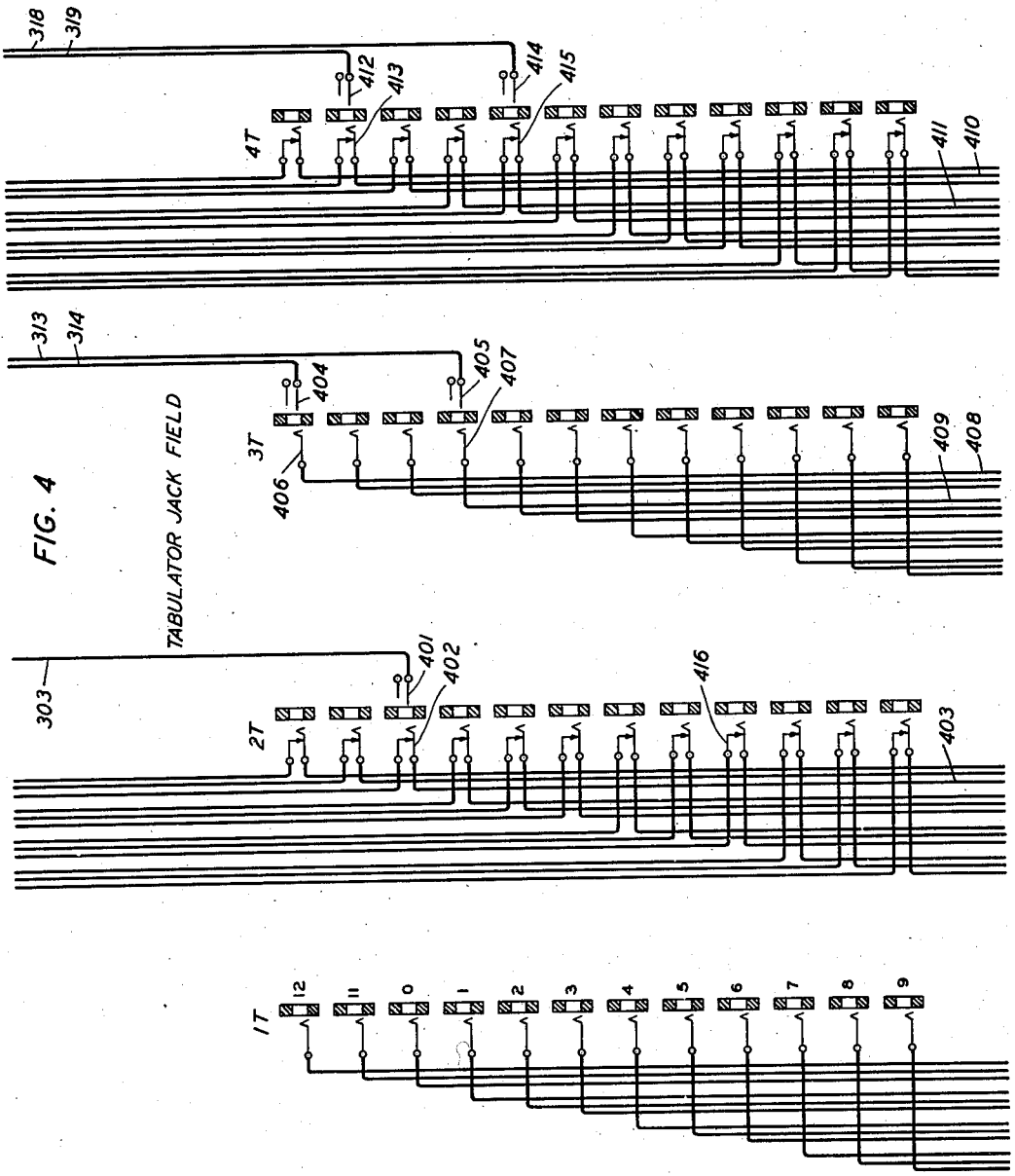
Figure 5:
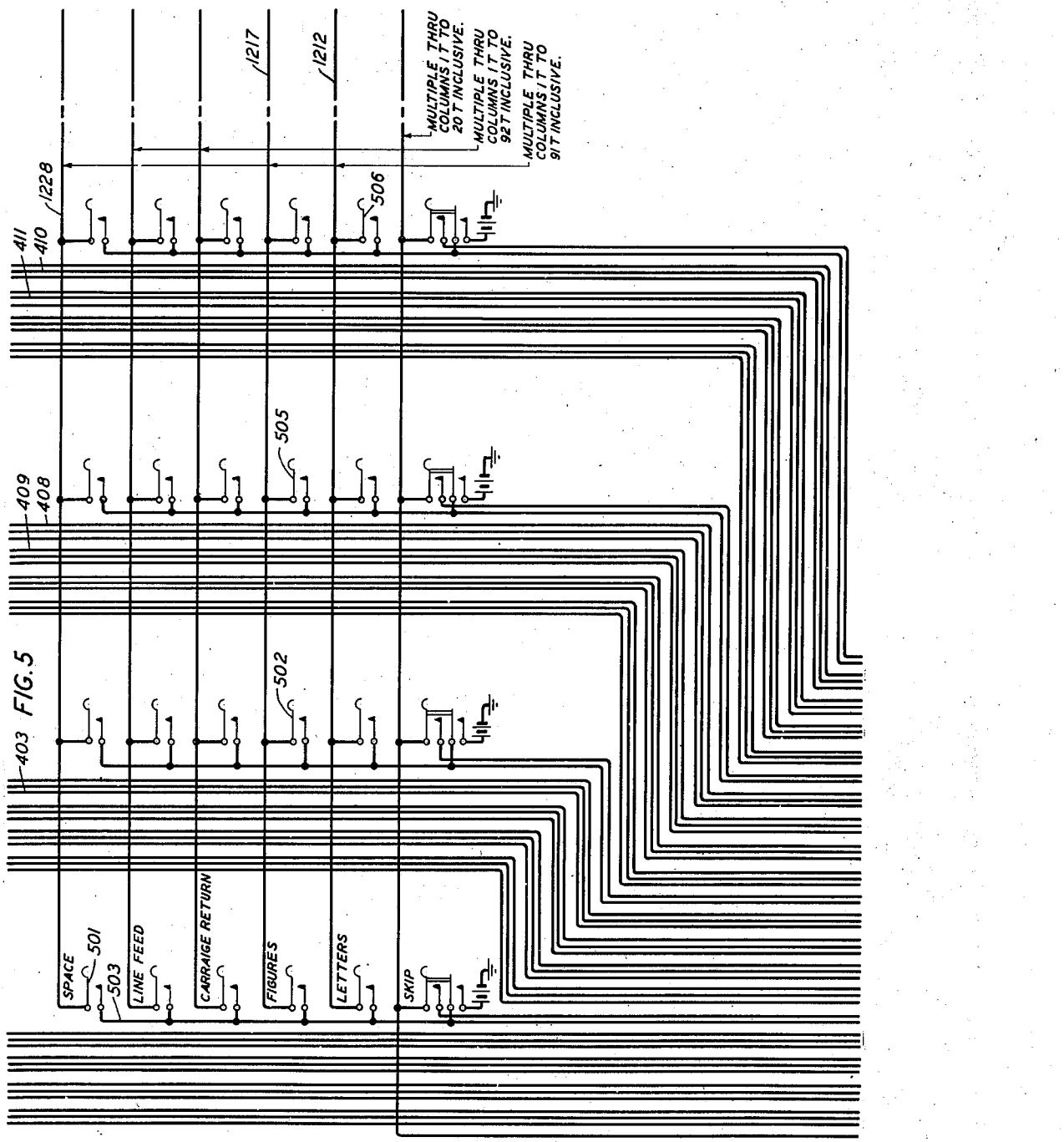
Figure 6:
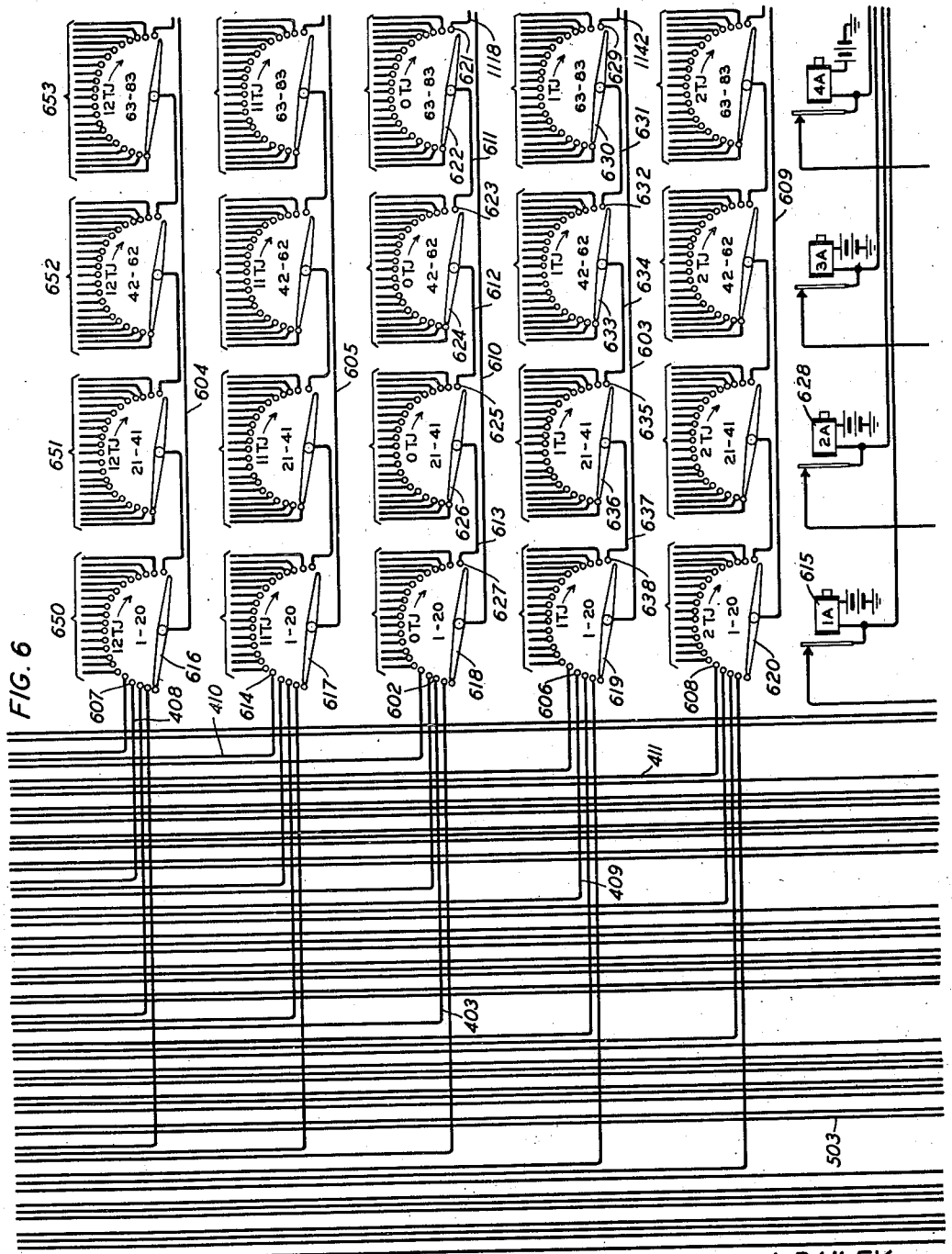
Figure 7:
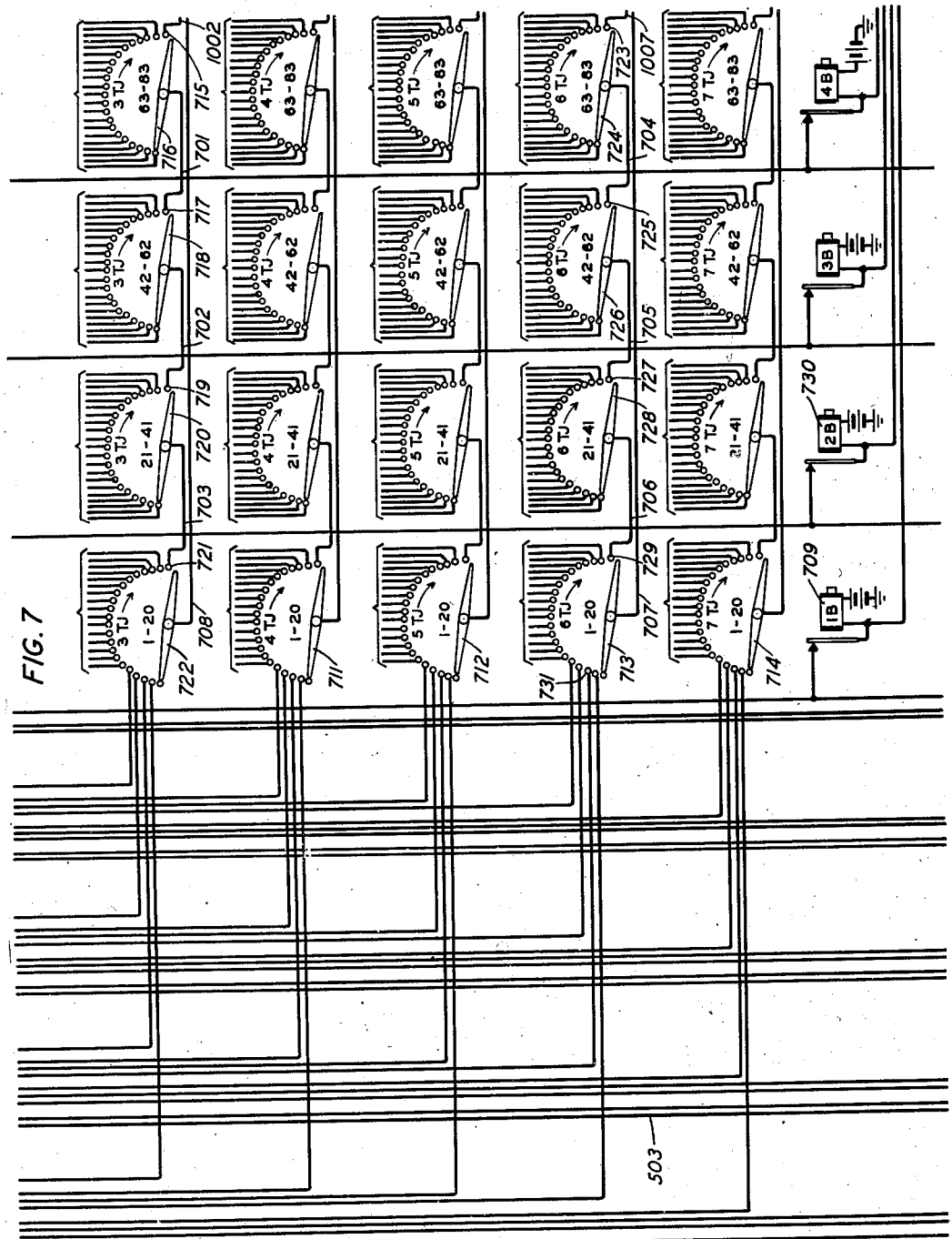

The first column of punches on the card is associated with the columns of jacks labeled IC in the "card jack field" and shown in Fig. 3 and jacks 2T in the "tabulator jack field", as shown in Fig. 4, which are connected to the third set of contacts in the banks of switch 650. Assume that the card has a hole punched in position 6 of this first column, as shown, and that it is desired to print figures on the teletypewriter in accordance with the punchings in this column. The figures switch 502 associated with the column of jacks 2T in the "Tabulator jack field" should, accordingly, be operated. Then when selector 650 reaches its third set of contacts, a circuit will be closed from ground on plate 204 through the hole in the card and spring 203, conductor 205, jacks 301 and 416, contact 731, wiper 713, conductor 707, winding of relay 1008 to battery through the left-hand contacts of relays 1107 and 1108 and the winding of relay 1144. Current flowing in this circuit will operate relay 1008 which in turn closes a circuit from battery over brush 1109, cam 1121, shaft 1135, cam 1017, brush 1010, contacts of relay 1008, brush 1125, cam 1126, cam 1131, brush 1127, right outer contacts of relay 1143, conductor 1217, key 502, contact 808, wiper 821, conductor 806 to ground through the teletypewriter. During the time that the selector was stepping from the second to the third set of contacts and the relay 1008 is operating to establish the above circuits the circuit to the teletypewriter is maintained closed to prevent false operation of the teletypewriter. This circuit may be traced from the battery connected to brush 1109, cam 1121, shaft 1135, segment 940 of cam 939, brush 938, conductor 846, to conductor 806 which is connected to ground through the teletypewriter 807. Soon after relay 1008 has operated and completed the circuit to the teletypewriter through cams 1121, 1017, 1126, and 1131, brush 938 breaks contact with the conducting segment 940 of cam 939. Then an impulse period begins during which two series of impulses are transmitted to the teletypewriter. The first series occupies the first half of this impulse period and selects either the figures or letters case of the teletypewriter. The second series of impulses occupies the second half of this period and controls the symbol to be recorded in the selected case. Thus, soon after the conducting segment 940 of cam 939 has revolved past brush 938, the insulating segment 1136 of cam 1126 engages brush 1125 which interrupts the circuit to the teletypewriter. This interruption is interpreted by the teletypewriter as a start signal. Then as the conducting segment 1137 of this cam makes contact with brush 1125 it transmits two marking impulses to the teletypewriter. Insulated segment 1138 then transmits a spacing impulse, and the remainder of the cam two more marking impulses and a stop impulse during the remainder of the first half of the impulse period. The size of these segments and the speed of the cams are so regulated that these impulses are of proper length and speed to satisfactorily operate the teletypewriter. This series of impulses will select the figures case. Then, after sufficient time has been allowed to send the stop impulse, insulated segment 1019 of cam 1017 revolves under brush 1018 which is included in the circuit to the teletypewriter so that a second start impulse is transmitted to it. Then as segments 1020, 1021, 1022, 1023, and 1024 of cam 1017 pass under brush 1010 they transmit marking, spacing, marking, spacing, marking and stop impulses respectively to the teletypewriter which cause it to record a figure 6. Thus the information recorded in any column may be recorded on the printing telegraph apparatus. It is to be understood that the specific codes described for punching the cards and operating the printing telegraph apparatus are only to illustrate the features of the invention since many other codes can be used, with the same results.

Just before the cams complete a revolution, cam 904 makes contact with brush 906 and causes the operation and release of the switch magnets 811, 709 and 615 which advance the switch 650 to the next set of contacts. However, before the contact between cam 904 and brush 906 is broken cam 939 makes contact with brush 938 and thus maintains the teletypewriter circuit closed while the selector steps to the next set of terminals and the circuits associated therewith are being established.

To illustrate how a punched character on the card can be caused to print some other character on the teletypewriter assume that a patching cord 303 having plugs 302 and 401 connected to its ends is connected by inserting plug 302 in jack 301 and plug 401 in jack 402 so that if a hole is punched in the first column of the card in position 6, a 0 (zero) will be transmitted to the teletypewriter provided figures are normally expected in this column so that key 502 has been operated. If, however, any other position is punched in the card the corresponding character will be transmitted to the teletypewriter. It will be assumed again that a hole has been punched in the card in position 6 in column 1 and that spring 203 makes contact through the hole with grounded plate 204. Ground through spring 203 is therefore connected over conductor 205 to jack 301 and plug 302, cord 303, plug 401, jack 402, conductor 403, contact 602 of switch 650 whose wipers are then standing on the third set of contacts of each bank, wiper 618, conductor 610, windings of relays 1148 and 1116 in series, through the left hand contacts of relays 1104, 1119, 1034, 1011, 1012, 1008, 1013, 907 and 908 to battery through the left-hand contacts of relays 1108 and 1107 and the winding of relay 1144. Battery through the contacts of relay 1148 and the winding of relay 1113 is also connected to conductor 610 but relay 1113 is slow in operating due to the presence of condenser 1120 which is connected in parallel with its winding so that relay 1148 operates first and removes the battery from the winding of relay 1113, and thus prevents its operation. Both relays 1116 and 1148 operate in the circuit just described. Relay 1116 operated, closes a circuit from battery through brush 1109, cam 1121, cam 1128, brush 1122, the contacts of relay 1116, brush 1125, cam 1126, cam 1131, brush 1127, right outer contacts of relay 1143, conductor 1217, key 502, contact 808, wiper 821, conductor 806 to ground through the teletypewriter 807. As the cams revolve pulses are sent as described above to the teletypewriter which during the first half of the impulse period correspond to the figures code and during the second half of the impulse period to the zero code which causes the teletypewriter to print a 0. Just before finishing the revolution cam 904 makes contact with brush 906, operating and releasing switch magnets 811, 709 and 615 as previously described and stepping the switch on to the fourth set of contacts. Also cam 939 and brush 938 again maintain the circuit of the teletypewriter closed during the transfer from the circuits controlled by one column of jacks in the "Tabulator jack field" to those controlled by the next column.

The fourth set of contacts of switch 650 correspond to the third position of the teletypewriter and are connected to the row of jacks labeled 3T in the "Tabulator jack field" which is used for duplicating and expanding and is not normally connected to jacks in the card field. To illustrate how a character may be printed although there is no corresponding punch on the card, patching cords have been used to cause a dollar sign to be printed in the third position of the teletypewriter. Thus, the plugs 305 and 405, and 306 and 404 connected to patching cords 313 and 314, respectively, are inserted in the respective jacks 315, 407, 316 and 406 which connects ground from jacks in the card field to jacks in positions 12 and 1 in the tabulator field which together with the operation of the figures key 505 complete the translator connections for the dollar sign. In this case relays 1107 and 1105 are operated. The first of these circuits is traced from ground through jack 316, plug 306, cord 314, plug 404, jack 406, conductor 408, contact 607, wiper 616, conductor 604 to battery through the winding of relay 1107. The second circuit is traced from ground through jack 315, plug 305, cord 313, plug 405, jack 407, conductor 409, contact 606, wiper 619, conductor 603, winding of relay 1105 to battery through the left-hand make contacts of relay 1107 and the winding of relay 1144. With relay 1105 operated a circuit is completed from battery through brush 1109, cam 1121, cam 1130, brush 1124, contacts of relay 1105, brush 1125 and cam 1126, cam 1131, brush 1127, right outer contacts of relay 1143, conductor 1217, key 505, contact 813, wiper 821, conductor 806 to ground through teletypewriter 807. As the cams revolve the code for figures is sent during the first half of the impulse period following by the code for the dollar sign. These two sets of code impulses are interpreted by the teletypewriter and cause it to print a dollar sign in position 3. As the cams complete the revolution, cam 904 makes contact with brush 906 causing magnets 811, 709 and 615 to be operated and released, advancing switch 650 to the fifth set of contacts.

The fifth contacts of switch 650 correspond to position 4 of the teletypewriter. To illustrate how a character designated by a single punch on the card can be cross-connected so that a character involving a double punch will be printed, cross-connections are shown so that if a single punch appears in position 3 of column 2 of the card the punch is taken to mean that the letter "J" is to be printed. The combination for the letter "J" consists of two punches one in the 11th card position, the other in the 2nd position, so a set of strapped jacks is used and ground from plate 204 to spring 206 over conductor 210, jack 308, plug 307 which is inserted in jack 308, cord 317, and plug 309 which is inserted in one of the strapped jacks 310 is transmitted to the strapped jack 310 and thence to plugs 311 and 312 which are also inserted in other of the strapped jacks 310. Plug 312 connects the ground over cord 319 to plug 412 which is inserted in jack 413, jack 413, conductor 410, contact 614, wiper 617, conductor 605 to battery through the winding of relay 1108, thus operating relay 1108. Plug 311 connects the ground through cord 318, plug 414 which is inserted in jack 415, jack 416, conductor 411, contact 608, wiper 620, conductor 609, winding of relay 1114 to battery through the left make contacts of relay 1108 left break contacts of relay 1107 and the winding of relay 1144. Current flowing in this circuit operates relay 1114. In this case key 506 in the letters position of this column is operated to indicate that letters are to be expected in this column so a circuit is completed from battery through brush 1109, cam 1121, cam 1132, brush 1115, contacts of relay 1114, brush 1112, cam 1123, cam 1129, brush 1111, contacts of relay 1113, right inner break contacts of relay 1143, conductor 1212, contacts of key 506, contact 814, wiper 821, conductor 806 to ground through teletypewriter 807. In this case, as the cams revolve the impulse corresponding to letters and to the letter "J" are transmitted and at the end of the revolution switch 650 is advanced as previously described.

In this manner the card is progressively scanned column by column and the information, with whatever changes or enlargements that are desired, is printed on the teletypewriter. When switch 650 steps onto its last or 22nd contacts, conductor 806 from the teletypewriter is transferred to wiper 824 which has access to the keys associated with the columns of jacks 21 to 41 of the tabulator jack field, and the windings of the relays which connect the cams to the keys are transferred through the other banks on switch 651 to the corresponding set of jacks in the tabulator field. Switch magnets 825, 730 and 628 operate in the same manner as magnets 811, 709 and 615 except that cams 914 and 915 are used instead of cams 904 and 905. When switch 651 has progressed over its contacts it rests on the last set of contacts and transfers the operating circuits to switch 652 which operates in a similar manner and then transfers the operating circuits to switch 653. When switch 653 has stepped to the last set of contacts it transfers the operating circuits to switch 1154. Only 7 positions of switch 1154 are required to print the remainder of the information terminating with column 91 of the tabulator jack field but one additional position is used to send the usual signals of line feed and carriage return. The 14 extra positions of switch 1154 are, therefore, left blank and the switch is arranged to skip these positions and proceed to the last position where a new card is introduced and all the switches are returned to their normal positions as will be hereinafter described.

To further illustrate the methods of translating the information contained on the card it will be assumed that switches 650, 651, 652 and 653 have progressed to their last sets of contacts and that switch 1154 has progressed to its sixth set of contacts which corresponds to the 89th column of jacks in the tabulator jack field. These sixth contacts of each bank of switch 1154 are shown connected to the row of jacks in the tabulator field labeled 89T and for purposes of illustration it will be assumed that it is desired to print a figure 3 in this position. To accomplish this, key 1225 is operated and plug 215 attached to one end of cord 216 is inserted in jack 214 and plug 1353 attached to the other end of cord 216 is inserted in jack 1355. Then ground is connected from grounded jack 214 through plug 215, cord 216, plug 1353, jack 1355, contact 1001, wiper 1014, conductor 1002, contact 715, wiper 716, conductor 701, contact 717, wiper 718, conductor 702, contact 719, wiper 720, conductor 703, contact 721, wiper 722, conductor 708, winding of relay 1004 to battery through the left hand contacts of relays 1108 and 1107 and the winding of relay 1144. Relay 1004 operates and closes a circuit from battery through brush 1109 and cam 1121, cam 1015, brush 1005, right-hand contacts of relay 1004, brush 1125, cam 1126, cam 1131, brush 1127, right outer contacts of relay 1143, conductor 1217, key 1225, contact 909, wiper 916, conductor 917, contact 826, wiper 827, conductor 828, contact 829, wiper 830, conductor 831, contact 832, wiper 824, conductor 833, contact 834, wiper 821, conductor 806 to ground through teletypewriter 807. In this case as the cams revolve they send impulses which are interpreted by the teletypewriter as the figure 3 which it then prints.

Column 45 is shown as the last column on the card and has been arranged to illustrate how a figure or other upper case character, except zero may be caused to be printed although the letters key (lower case) may be operated. This is accomplished by adding the character 0 to the character which is intended to be printed. It is assumed that holes are punched in the card in positions 6 and 0 and that springs 207 and 208 are therefore connected to the grounded plate 204 and that letters key 1227 is operated. Relay 1008 is operated in a circuit from ground on spring 208, conductor 212, jack 219, conductor 220, jack 1359, conductor 1360, contact 1006, wiper 1016, conductor 1007, contact 723, wiper 724, conductor 704, contact 725, wiper 726, conductor 705, contact 727, wiper 728, conductor 706, contact 729, wiper 713, conductor 707 through the winding of relay 1008 to battery through the left hand contacts of relays 1108 and 1107 and the winding of relay 1144. Relay 1113 is also operated in a circuit from ground on spring 207 over conductor 211, jack 217, conductor 218, jack 1357, conductor 1358, contact 1117, wiper 1133, conductor 1118, contact 621, wiper 622, conductor 611, contact 623, wiper 624, conductor 612, contact 625, wiper 626, conductor 613, contact 627, wiper 618, conductor 610, winding of relay 1113 to battery through the contacts of relay 1148. In this case the parallel path from conductor 610 through relays 1148 and 1116 is opened at the left-hand contacts of relay 1008, so relays 1148 and 1116 do not operate and open the operating path for relay 1113 as was the case when the card contained only a single punch in position 0. The operation of relay 1113 causes cam 1126 to be used in the sending of pulses, instead of cam 1123 thereby changing the character from letters to figures. The circuit to the teletypewriter is traced from battery through brush 1109, cam 1121, cam 1017, brush 1010, the right-hand contacts of relay 1008, brush 1125, cam 1126, cam 1131, brush 1127, the operated contacts of relay 1113, right inner break contacts of relay 1143, conductor 1212, the contacts of key 1227, contact 918, wiper 916, conductor 917, contact 826, wiper 827, conductor 828, contact 829, wiper 830, conductor 831, contact 832, wiper 824, conductor 833, contact 834, wiper 821, conductor 806 to ground through teletypewriter 807. Then as the cams revolve they interrupt this circuit to send two series of impulses to the teletypewriter, the first series representing the figures case and the second the figure 6. This causes the teletypewriter to print a 6 instead of Y as it would with the letters key operated and no punch in the 0 position of the column being scanned. As the cams complete the revolution the switch 1154 will be advanced as above described.

Thus to obtain an upper case character, except zero, in a column for which the letters key (lower case) is operated, when the character is designated by a double punch using either position 11 or 12 and a position in the 1 to 9 group, a circuit similar to the one traced in the preceding paragraph is established. The zero position is punched on the card in addition to the other two punchings, thus relay 1113 is operated as before to cause the figures cams 1126 and 1131 to be connected in place of the letters cams 1123 and 1129, while the relays 1116 and 1148 are prevented from operating because of the operation of one of the double punch relays 1107 or 1108.

To obtain the zero in a column wherein letters are normally being printed, the zero, 11, and 12 positions are all punched on the card. The circuits may be traced from ground on plate 204, through the perforations in the three top positions to conductors 604, 605 and 610. Relays 1107 and 1108 operate and close both sets of right-hand contacts, which are useful only when both relays 1107 and 1108 are operated. The outer right-hand contacts close the circuit from battery, through relay 1144, the said contacts, through relay 1113 to conductor 610. Relay 1113 operates and connects the figures cams 1126 and 1131 as before, in the signal circuit. Relay 1116 is operated because a circuit has been established from conductor 610 through relay 1148 (which performs no useful function in its operation at this time), relay 1116, the left-hand contacts of relays 1104, 1119, 1004, 1011, 1012, 1008, 1013, 907, 908, conductor 1009, the inner right-hand contacts of relays 1108 and 1107, through relay 1144 to battery. Operation of relay 1116 connects the cams 1128 and 1121 to the signal circuit and permits the signals for the zero character to be transmitted in a manner already described.

Now assume that holes are punched in the 0 and 6 positions of the 45th column of the card as before and that the automatic zero key 221 is operated, that plug 222 connected to the end of cord 223 is inserted in jack 217, that plug 1354 connected to the other end of cord 223 is inserted in jack 1356 and that the figures keys 1225 and 1226 are operated but that the plugs 215 and 1353 connected to cord 216 are not inserted in jacks 214 and 1355 respectively. With these cross-connections and punches in positions 0 and 6 of this column of the card the teletypewriter will print 16, the 1 being in one column and the 6 in the next column. If no punches had been made in this column of the card the teletypewriter would have printed nothing in the first column and 0 in the second. If only the zero position had been punched in this column of the card the teletypewriter would have printed 10. Thus the zero punch may be used to control a character (such as the one just mentioned) in another column without the loss of the zero in the column in which it is punched. Hence, it is possible to print any number from 0 to 19 in this manner, and if the contacts associated with positions 11 and 12 in this column of the card are cross-connected to the tabulator jacks so as to select 2 and 3 respectively in the preceding column, punches in one column of the card will cause the teletypewriter to print any number between 0 and 39.

The circuits for printing 16 from the punches in the 6 and 0 positions of the 45th column of the card will now be traced. When selector 1154 reaches its sixth set of contacts which are connected to the column of jacks numbered 89T in the tabulator jack field, a circuit may be traced from ground on plate 204 through the hole in the zero position of the 45th column of the card, spring 207, conductor 211, jack 717, plug 222, cord 223, plug 1354 (inserted in jack 1356), jack 1355, conductor 1229, contact 1139, wiper 1140, conductor 1142, contact 629, wiper 630, conductor 631, contact 632, wiper 633, conductor 634, contact 635, wiper 636, conductor 637 contact 638, wiper 619, conductor 603, winding of relay 1104, to battery through the left-hand contacts of relays 1107 and 1108 and the winding of relay 1144. Current flowing in this circuit operates relay 1104 which completes a circuit from battery through brush 1109, cams 1121 and 1147, brush 1110, contacts of relay 1104, brush 1125, cams 1126 and 1131, brush 1127, right outer contacts of relay 1143, conductor 1217, key 1225, contact 909, wiper 916, conductor 917, contact 826, wiper 827, conductor 828, contact 829, wiper 830, conductor 831, contact 832, wiper 824, conductor 833, contact 834, wiper 821, to ground through the teletypewriter 807, over line 806. Shortly after conducting segment 940 of cam 939 revolves past brush 938 and removes battery from line 806 over conductor 846, cam 1126 interrupts the circuit to the teletypewriter and sends impulses which select the figures or upper case. Then cam 1147 transmits impulses which represent 1 which is then printed by the teletypewriter. After these signals have been transmitted and the cams complete a revolution, cam 939 again connects battery to line 846 and thus maintains this circuit closed during the switching of the transmitting circuits. Then cams 929 and 930, and brushes 928 and 931 momentarily close the circuit of stepping magnets 911, 1018, and 1134 which advance selector 1154 to its seventh set of contacts. Then a circuit extends from ground on plate 204 through the hole in the sixth position of column 45 of the card through spring 208, conductor 212, jack 219, conductor 220, jack 1359, conductor 1360, contact 1006, wiper 1016, conductor 1007, contact 723, wiper 724, conductor 704, contact 725, wiper 726, conductor 705, contact 727, wiper 728, conductor 706, contact 729, wiper 713, conductor 707 through the winding of relay 1008 to battery through the left hand contacts of relays 1108 and 1107 and the winding of relay 1144. Current flowing in this circuit operates relay 1008. A circuit is then completed from battery through brush 1109, cam 1121, shaft 1135, cam 1017, brush 1010, right-hand contacts of relay 1008 brush 1125, cam 1126, cam 1131, brush 1127, right outer contacts of relay 1143, conductor 1217, contacts of key 1226 which has previously been operated, contact 918, wiper 916, conductor 917 and to the teletypewriter 807 through switches 653, 652, 651 and 650 and line 806. The impulses for the figures case and character 6 are then sent to the teletypewriter, which will print the 6 in the column following the 1 printed just previously. A circuit is also completed from ground at the automatic zero key 221 to relays 1148, 1116 and 1113 through contacts and wipers of the selectors as hereinbefore traced. This operates relay 1113 at this time but not relays 1148 and 1116 since their operating circuit is open at the left-hand contacts of relay 1008. The operation of relay 1113 performs no useful function at this time since the lead to its armature contact is open at switch 1227. However, if there are no punches in any of the positions of the card connected to column 90T, relays 1148 and 1116 will operate and connect cam 1128 in the circuit of the teletypewriter. This will cause code impulses to be transmitted to the teletypewriter which will then print a zero for this column.

In some columns of some cards there may be no punches and in the same columns of other cards there may be punches. In this case it is desirable to send a spacing signal to the teletypewriter so that the information recorded in the remaining columns on the card will be printed in the respected columns on the teletypewriter. This condition is also true for the illustration given above. If there is no punch in the zero, eleventh or twelfth positions on the card it is desirable to send a space to the teletypewriter for the column represented or controlled by the column of jacks 89T. If a space is not transmitted then the units character as controlled by the card through the colmun of jacks 90T will be printed in the tens column on the teletypewriter and the characters printed in the remaining columns will be shifted one space or column to the left on the teletypewriter. To avoid this condition a spacing signal is sent to the teletypewriter when the figures or letters key is closed and none of the conductors from the associated column of tabulator jacks is grounded.

To accomplish this, relays 1144 and 1143 are provided. Relay 1144 is connected in series with the battery supply for operating the relays controlled by the leads from the tabulator jacks. If any of these relays operate and prepare a circuit for transmitting impulses to the teletypewriter, relay 1144 will also operate and open its contacts and the operation of the circuits will be as described above. However, if the circuits of all these selecting relays are open so that none of them operates to complete a circuit to the teletypewriter before the impulse period, relay 1144 will not operate either since its winding is in series with the operating circuits of these relays. Then just before the impulse period, cam 1223 will complete a circuit from battery through cams 1216 and 1223 and associated brushes 1211 and 1224 respectively, winding of relay 1143 to ground through the contacts of relay 1144. Relay 1143 in operating connects ground to its winding through its left-hand contacts so it will remain operated during the entire impulse period. Relay 1143 also disconnects the letters and figures keys in the tabulator jack field, from the letters and figures cams 1123 and 1126 and connects them to the space cam 1210 so a space will be transmitted to the teletypewriter during the impulse period.

Column 91T of the tabulator jack field has been used to illustrate the use of the skip key. The skip key 1213 is therefore operated and when the switch advances to the contacts connected to the jack in column 91T a circuit is closed from ground through wiper 823, contact 835, conductor 836, wiper 815, contact 837, conductor 838, wiper 816, contact 839, conductor 840, wiper 817, contact 841, conductor 919, wiper 910, strapped contacts 920, wiper 921, contact 902, the contacts of skip switch 1213, conductor 1218, the winding of relay 901 to battery through the contacts and windings of switch magnets 911, 1018 and 1134 in parallel. The switch magnets and relay 901 operate in this circuit. The switch magnets break the circuit as soon as all of them are operated so that they release and advance the wipers of these switches to the next set of contacts. The operation of relay 901 opens the circuit to clutch magnet 1201, releasing clutch 1203 and allowing jack column 91T to be skipped without having to wait for the cams to complete a revolution. To prevent a false start by the teletypewriter while the skip mechanism is functioning, its circuit is kept closed by means of the lower contacts on the skip key.

Column 92T is equipped only to give line feed, carriage return or skip indications. If it is desired to give line feed and carriage return as will be usual, keys 1214 and 1215 are both operated and during the first half of the impulse period a path is closed from battery through brush 1211, cam 1216, cam 1222, brush 1219, the contacts of key 1214, conductor 1221, contact 912, wiper 916, conductor 917, contact 826, wiper 827, conductor 828, contact 829, wiper 830, conductor 831, contact 832, wiper 824, conductor 833, contact 834, wiper 821, conductor 806 to ground through teletypewriter 807. As this cam revolves it transmits impulses to the teletypewriter which cause it to actuate its line feed mechanism. During the second half of the impulse period battery is connected through cam 1230, brush 1220 and the contacts of key 1215 to conductor 1221 to transmit the impulses for carriage return to the teletypewriter.

The switch having progressed to the next set of contacts beyond the last one which is connected to jacks and keys in the tabulator field, arrangements are provided to return switches 650, 651, 652, 653 and 1154 to their normal positions with their wipers standing on the first set of contacts in each case and to cause the card which has just been scanned to be removed and the next one in the container 213 to take its place. Thus when the wipers of switch 1154 make contact with the ninth set of contacts on the banks, a circuit is closed from ground through wiper 823, contact 835, conductor 836, wiper 815, contact 837, conductor 838, wiper 816, contact 839, conductor 840, wiper 817, contact 841, conductor 919, wiper 910, strapped contacts 920, wiper 921, strapped contacts 922, conductor 923, through the winding of relay 901 to battery through the contacts and windings of switch magnets 911, 1018 and 1134 in parallel. The switch magnets operate but immediately release after they have opened their contacts and advance the wipers to the next position. The circuit just described is not changed by the advance of the switch to the next position and, in this manner, the switch is stepped by self interruptions to the last contact where the circuit is changed so that the switch stops. Relay 901 is operated and releases clutch magnet 1201 so that the cams do not revolve while the switch is advancing under self interruptions.

In the last position of switch 1154 a circuit is closed from ground through wiper 823, contact 835, conductor 836, wiper 815, contact 837, conductor 838, wiper 816, contact 839, conductor 840, wiper 817, contact 841, conductor 919, wiper 910, contact 924, the winding of relay 926, contact 927, wiper 921, brush 928, cam 929, cam 930, which when the cams have nearly completed the revolution extends the ground through brush 931 to battery through the windings of magnets 911, 1018 and 1134 in parallel. The switch magnets operate and when cam 930 breaks the circuit with brush 931 as the revolution is completed the switch magnets release and advance switch 1154 to its normal position on the first set of contacts. Relay 926 operates near the end of the cam's revolution, and remains operated only while brush 931 is in contact with the conducting segment of cam 930. The closing of the left-hand contacts of relay 926 holds the ground connection for the switch magnets of switches 650, 651, 652, 653 and 1154, as long as the conducting segments of cams 930, 941, 942, 914 and 904 are in contact with their respective brushes. The contacts between these conducting segments and brushes are made simultaneously and broken simultaneously, thus at the instant of breaking contact, all the switches step around to normal together. The circuits for the operation of the switch magnets of switches 650, 651, 652 and 653 are similar to that for the magnet of switch 1154, except that the winding of relay 926 is excluded and the ground connection is obtained from conductor 810 through the left-hand contacts of relay 926, in parallel with the ground circuit through contacts 924, 841, 839, 837 and 835, wiper arms 810, 817, 816, 815 and 823, and conductors 919, 840, 838 and 836. The operation of relay 926 also releases relay 202 by opening its locking path through the right-hand contacts of relay 926 and operates card passage control magnet 209 in a circuit traced from ground on the right hand contacts of relay 926, conductor 1351 to battery through the winding of magnet 209. The operation of magnet 209 causes the card which has just been scanned to be removed from its position in front of plate 204 and a new card from container 213 to be substituted. Since the specific details of this card handling mechanism do not form a part of this invention they have not been described. In passing into position the new card momentarily operates contacts 201 causing the operation of relay 202 which in turn starts the scanning of the new card as previously described. The circuit from battery to the teletypewriter is kept closed after the signals for column 92T have been sent because the last thirteen contacts wiped by wiper 916 are strapped and connected to battery.

In this manner information recorded on punched cards may be translated and printed on a teletypewriter and while certain specific illustrations have been described with relation to certain columns it is to be understood that they may be applied to any column. Thus when it is desired to skip any column of contacts or jacks without causing the operation of the teletypewriter, the skip key associated with that column of jacks or contacts is operated. When it is desired to skip a column of contacts or jacks and at the same time send a space to the teletypewriter the space key is operated. In addition any other changes or additions to the information recorded in any column on the card may be made by suitable cross-connections between the jacks in the "Card jack field" and the "Tabulator jack field".

In addition it is to be understood that the above description is for the purpose of illustrating the features of this invention and is not to limit its scope as defined in the following claims.

What is claimed is:

1. A tabulating system employing perforated cards comprising a plurality of contacts arranged in columns which are controlled by the perforations in said cards, selectors connected to said contacts for selecting successive columns of said contacts, a group of relays associated with said selectors which are controlled by said contacts, a plurality of transmitting cams for transmitting groups of telegraph current impulses representing a permutation code, said cams being selected by said relays in accordance with the perforations in said cards, and a printing telegraph receiving mechanism connected to said selected cams through said selectors and said relays, whereby the information stored on said card will be printed by said printing telegraph mechanism.

2. A tabulating system employing perforated cards having the perforations in columns comprising a plurality of contacts which are controlled by the perforations in said cards, selectors having a plurality of contacts for selecting a column of said card controlled contacts, a plurality of jacks connected to said selected contacts and said card controlled contacts whereby said selected contacts and said card controlled contacts may be cross-connected, a plurality of telegraph signal transmitting cams, a group of relays connected to said selectors for selecting said cams, in accordance with the perforations in said cards, and a printing telegraph receiving mechanism connected to said transmitting cams for printing the characters in accordance with the received signals which are transmitted by said cams under control of the perforations of said cards.

3. A teletypewriter in combination with a card translator employing perforated cards having the perforations arranged in columns which comprises a plurality of contacts controlled by said perforated cards, selectors connected to said contacts for successively selecting the contacts associated with each column of said perforations in said cards, a plurality of telegraph impulse transmitting cams, each cam of which transmits a code combination of impulses representing a symbol, a group of relays connected to said selector for selecting said cams for transmitting a code combination of telegraph impulses in accordance with the perforations in said cards, a telegraph transmission channel connected to said transmitting cams through said selectors and said relays and a printing telegraph receiving mechanism connected to said telegraph channel for recording the symbol in accordance with the received telegraph impulse code combination.

4. A perforated card controlled telegraph transmitter comprising a plurality of contacts arranged in columns and controlled by perforated cards, a selector connected thereto for successively selecting said column of contacts, a plurality of cams each adapted to transmit a telegraph signal representing a character, a group of relays connected to said selector for selecting the transmitting cams in accordance with the perforations in said cards and a telegraph transmission channel connected to said transmitting cams.

5. A perforated card controlled telegraph transmitter comprising a plurality of contacts controlled by the cards, selectors having a plurality of contacts arranged to successively select groups of said contacts, a plurality of jacks connected to said card controlled contacts and said selected contacts whereby said card controlled contacts may be cross-connected to said selected contacts, a plurality of telegraph signal transmitting cams, each for transmitting a telegraph code combination of impulses corresponding to a symbol, a group of relays connected to said selector for selecting the transmitting cams in accordance with the perforations in said cards, and a telegraph transmission circuit connected to said transmitting cams.

6. Means for listing the information recorded on perforated tabulating machine cards on a page printing telegraph mechanism comprising a group of contacts controlled by said cards, selectors connected to said contacts for successively selecting the contacts associated with one column of the perforations of said cards, a plurality of telegraph signal cams for transmitting telegraph signals representing the characters to be printed, a group of relays connected to said selectors for selecting the transmitting cams in accordance with the perforations of said cards, a receiving telegraph printing mechanism connected to said cams and means to advance the paper, and to return the carriage of said teletypewriter and to restore the selector to normal after all the desired information of each card has been tabulated.

7. A statistical card translator which comprises in combination a printing telegraph receiving mechanism and a statistical card controlled translating device for translating perforations in said cards into permutation code groups of telegraph signal impulses and telegraph signal transmitting means for transmitting said impulses over a single telegraph channel to said receiving mechanism.

8. A translator in accordance with claim 7 having means for printing either figures or other symbols or letters in any column.

9. A translator in accordance with claim 7 characterized in this that means are provided for printing figures or other symbols in a column in which letters are normally printed.

10. In combination a telegraph printing mechanism, a statistical card translator and a telegraph transmitter for transmitting permutation code groups of successive telegraph signal impulses controlled by said card translator and a single telegraph communication channel for connecting said printing mechanism to said telegraph transmitter.

11. A tabulating system employing perforated cards having the perforations in columns, columns of contacts controlled by the perforations in said cards, selectors having a plurality of contacts for selecting successive columns of said card controlled contacts, a group of relays associated with the selectors and controlled by the perforations in said cards, a plurality of telegraph signal transmitting cams selected by said relays in accordance with the perforations on said cards, said cams being designed to transmit groups of telegraph current impulses representing a permutation code, and a printing telegraph receiving mechanism connected to said selected cams through said selectors and said relays, whereby the information stored on said cards will be printed by said printing telegraph mechanism.

12. A tabulating system as in claim 11, having a plurality of jacks connected to the columns of contacts controlled by the perforations in the cards and connected also to the plurality of contacts on the selectors, whereby said card controlled contacts and said selector contacts may be cross-connected.

13. A card translator in combination with a teletypewriter, said translator employing perforated cards in which the perforations are set up as columns of electrical contacts connected to jacks which are cross-connected to other jacks which in turn are connected to a plurality of contacts on selectors, said selectors are controlled by the said columns of electrical contacts, are associated with relays controlled through the selectors by the said columns of electrical contacts, and select successive columns of contacts for connection to the circuit of the teletypewriter; a plurality of telegraph impulse transmitting cams selected by said relays to cause groups of telegraph current impulses to be sent to the teletypewriter in accordance with the perforations on the said card and thereby cause the teletypewriter to print symbols designated by the perforations on the said card.

14. A card translator in combination with a teletypewriter as in claim 13, with means provided in the translator to simulate perforations on the cards.

15. A card translator in combination with a teletypewriter as in claim 13, each of the said telegraph impulse transmitting cams being adapted to send a group of telegraph current impulses according to a permutation code, each group of said impulses being designed to actuate the teletypewriter to properly tabulate the information derived from the said perforated cards.

16. In a combination, a telegraph printing mechanism, a statistical card controlled translator, a telegraph transmitter controlled thereby for transmitting permutation code groups of telegraph signal impulses, means for connecting said printing mechanism to said telegraph transmitter, said translator and telegraph transmitter being free from control of said printing telegraph printing mechanism.

17. A tabulating system employing statistical cards having perforations representing information recorded on said cards comprising means for translating the perforations in said cards into groups of code combinations of electrical impulses, an extended telegraph transmission system, means for connecting a single channel of said telegraph system to said translating means, and a printing telegraph mechanism connected to said channel of said telegraph system for printing the information recorded on the perforated cards.

18. A tabulating system employing statistical cards having perforations representing information recorded on said cards comprising means for translating the perforations in said cards into different groups of permutation code groups of electrical impulses for each character of the alphabet, each numeral and each symbol which may be recorded on said cards, a telegraph system a single channel of which is connected to said translating means and a printing telegraph mechanism connected to said channel for printing an individual symbol for each character of the alphabet, numeral, and symbol in accordance with the information recorded in the perforated cards.

AUSTIN BAILEY.
HOWARD M. THOMSON.